(12) United States Patent
Lackner et al.

(10) Patent No.: US 7,870,073 B2
(45) Date of Patent: Jan. 11, 2011

(54) METHOD TO PAY WITH A SMART CARD

(75) Inventors: Christian Lackner, Graz (AT); Stefan Eder, Graz (AT)

(73) Assignee: NXP B.V., Eindhoven (NL)

( * ) Notice: Subject to any disclaimer, the term of this patent is extended or adjusted under 35 U.S.C. 154(b) by 1483 days.

(21) Appl. No.: 10/514,154

(22) PCT Filed: Apr. 23, 2003

(86) PCT No.: PCT/IB03/01723

§ 371 (c)(1),
(2), (4) Date: Nov. 5, 2004

(87) PCT Pub. No.: WO03/096286

PCT Pub. Date: Nov. 20, 2003

(65) Prior Publication Data

US 2006/0178989 A1    Aug. 10, 2006

(30) Foreign Application Priority Data

May 10, 2002    (EP)    ................................. 02100474

(51) Int. Cl.
     *G06Q 40/00*    (2006.01)
(52) U.S. Cl. .......................................... 705/41; 705/35
(58) Field of Classification Search .................. 705/41, 705/35

See application file for complete search history.

(56) References Cited

U.S. PATENT DOCUMENTS

| | | | |
|---|---|---|---|
| 6,018,717 A * | 1/2000 | Lee et al. | ....................... 705/13 |
| 6,065,675 A * | 5/2000 | Teicher | ........................ 235/380 |
| 6,088,680 A * | 7/2000 | Hoshino et al. | ................ 705/13 |
| 6,505,774 B1 * | 1/2003 | Fulcher et al. | ............... 235/381 |
| 2003/0022719 A1 * | 1/2003 | Donald et al. | .................. 463/42 |
| 2003/0208439 A1 * | 11/2003 | Rast | ............................ 705/38 |

OTHER PUBLICATIONS

Steve Elliot, & Claudia Loebbecke. (2000). Interactive, inter-organizational innovations in electronic commerce. Information Technology & People, 13(1), 46. Retrieved Sep. 1, 2010.*

* cited by examiner

*Primary Examiner*—Narayanswamy Subramanian
*Assistant Examiner*—Kito R Robinson

(57) ABSTRACT

A payment method (BV) executed by a communication facility (1, 2, 8, N) and at least one data carrier (11, 12, K) for debiting a payment value unit (BW) from the data carrier (11, 12, K), in order to pay for a performed service, wherein the following steps are executed:
debit from a memory value unit (SW) stored in the data carrier (11, 12, K), of a debit value unit (AW) sufficient for payment for the maximum service to be performed, wherein a repayment limit (RL) stored in the data carrier (11, 12, K) is set to the value in essence of the debited debit value unit (AW);
calculation of a credit value unit (AWE) to be credited back, wherein the payment value unit (BW) to be paid for the actually performed service is subtracted from the debited debit value unit (AWE);
check by the data carrier (11, 12, K), that the credit value unit (AWE) to be credited does not exceed the stored repayment limit (RL), wherein only in this case is the credit value unit (AWE) credited to the memory value unit (SW) stored in the data carrier (11, 12, K).

20 Claims, 3 Drawing Sheets

METHOD TO PAY WITH A SMART CARD

The invention relates to a payment method executed by a communication facility and at least one data carrier, for debiting a payment value unit directly from the data carrier in order to pay for a performed service, wherein the following steps are executed:
  debit from a memory value unit stored in the data carrier, of a debit value unit sufficient for payment for the maximum service to be performed;
  calculation of a credit value unit to be credited back, wherein the payment value unit to be paid for the actually performed service is subtracted from the debited debit value unit;
  credit of the credit value unit to the memory value unit stored in the data carrier.

The invention further relates to a data carrier for paying for a performed service by debiting a payment value unit directly from a memory value unit stored in the data carrier with:
  storage means for storing the memory value unit; and
  communication means for communicating with a communication facility for crediting a credit value unit to be added to the stored memory value unit and for debiting a debit value unit to be subtracted from the stored memory value unit.

The invention further relates to a communication facility, which enables the payment for a performed service by debiting of a payment value unit from a memory value unit stored in a data carrier, with communication means for:
  communication with the data carrier for debiting a debit value unit sufficient for payment for the maximum service to be performed from the memory value unit stored in the data carrier; and
  crediting a credit value unit, wherein the payment value unit to be paid for the actually performed service is subtracted from the debited debit value unit.

Such a payment method, such a data carrier and such a communication facility are known from the document WO 97/30421. The known data carrier is here formed by a smart card, which may be inserted into a parking meter for paying a parking fee for parking in a parking garage, wherein the parking meter forms a communication facility. According to the known payment method, a maximum parking fee (maximum debit value unit) is initially debited from the credit (a memory value unit) stored on the smart card, this maximum parking fee amounting for example to 20 euro and being the charge for parking for 24 hours or more in the parking garage. If the user now wants to leave the parking garage after only one hour, and thus only has to pay the parking fee (a payment value unit) of 4 euro for one hour's parking, then the parking meter calculates the credit value unit of 16 euro to be credited back, and credits this amount back to the smart card, so that the memory value unit stored in the smart card is increased by this amount.

When only a few memory value units remain stored on the smart card, the user can pay a sum of money in cash or by debiting the sum from his account, at an automatic recharging device which likewise forms a communication facility, and thereby achieve the crediting of a credit value unit corresponding to the sum of money paid, wherein the credit value unit is added to the stored memory value unit and again stored in the smart card. Both the crediting by the parking meter and the crediting by the automatic recharging device take place only after the exchange and checking of the key information stored in the data carrier and in the communication facilities, in order to prevent improper crediting.

With the known payment method, the known data carrier and the known communication facility, the following fact has emerged in practice. The crediting devices are always installed in a highly secure environment, such as a bank, in order to avoid criminal manipulation. Communication facilities, which originally were provided only for debiting sums of money such as the parking fee and through the known payment method are now provided both for debiting and also for crediting of sums of money, hence also now contain the key information that authorizes the communication facility to credit sums of money or credit value units.

This has led to the disadvantage that parking meters installed for instance in parking garages have been stolen by unauthorized persons, who thus came into possession of the secret key information. These persons were thereby enabled to credit sums of money or memory value units as wished to any smart cards as wished, which is very disadvantageous.

It is an object of the invention to create a payment method according to the type specified in the first paragraph, a data carrier according to the type specified in the second paragraph and a communication facility according to the type specified in the third paragraph, in which the previously stated disadvantages are avoided. To achieve the above object in such a payment method, a repayment limit is set when a debit value unit is debited, this limit amounting in essence to the value of the debited debit value unit, and the data carrier checks that the credit value unit to be credited does not exceed the stored repayment limit and only if this is the case is the credit value unit credited to the memory value unit stored in the data carrier.

To achieve the above object with such a data carrier, the storage means are developed for storing a repayment limit, and limit setting means are developed for setting the repayment limit in essence to the value of the last debited debit value unit, and limit checking means are developed to check that the credit value unit to be credited does not exceed the stored repayment limit, and only if this is the case is the credit value unit credited to the memory value unit stored in the data carrier.

As a result of the features according to the invention, a repayment limit is set to the amount of the debited debit value unit when a debit value unit is debited from the data carrier. If a communication facility wants to credit a credit value unit to the data carrier, the data carrier checks that this credit value unit to be credited does not exceed the stored repayment limit, and only executes the credit if this is the case. This results in the advantage that if a person without authorization for this obtains by theft of a communication facility the secret key information for crediting memory value units, only an overall debit is possible and the memory value units stored in the data carrier can never be increased. This is especially advantageous for systems with so-called prepaid data carriers, as in such systems a credit to increase the stored memory value units is not intended.

The payment method according to the invention leads to a new business method, which enables payment for a service before the service is performed, wherein the provider of the service obtains in advance a sum of money (debit value unit) that is certainly sufficient, and the sum paid in excess (credit value unit) is reimbursed at a later time when the extent of the service and its price is established, with the provision of the repayment limit ensuring the greatest security.

As claimed in the measures of claim 2, the advantage is gained that with each credit the repayment limit set for a preceding debit is reduced, and after several credit transactions no more could be credited in total than was debited beforehand.

As claimed in the measures of claim 3, the advantage is gained that after each debit only a single credit is possible. This has the advantage for example with the previously described example of application with the parking meter for paying the parking fee, that repeated crediting is not wanted and intended, and this can only be an improper use.

To achieve the above object with such a communication facility, key information storage means are provided for storing key information, which identifies an authorization for crediting by the communication facility, wherein the communication facility is authorized to credit the credit value unit up to at most the value of a maximum credit limit if the stored key information identifies a first credit authorization, and wherein the communication facility is authorized to credit the credit value unit up to at most the value of a repayment limit stored in the data carrier if the stored key information identifies a second credit authorization, where the repayment value limit does not exceed the debit value unit last debited from the data carrier.

As claimed in the measures of claim 4 and claim 11, the advantage is gained that two types of communication facilities with different credit authorizations may be provided. Communication facilities provided in a highly secure environment may thus be equipped with the first credit authorization for crediting sums of money up to a relatively high maximum limit for credits. Communication facilities installed in a relatively insecure environment, which are provided for payment of the respective performed service, may be equipped with only the second credit authorization for security reasons. Even if a person without the authorization steals the key information identifying the second credit authorization, this person may credit no memory value units overall to data carriers according to the invention.

As claimed in the measures of claim 5, the advantage is gained that the data carrier checks before debiting the debit value unit that the memory value unit would not fall below a minimum value as a result of the debiting. This avoids the possibility that undesired high sums, which are not covered by the memory value units stored in the data carrier, cannot be paid with the data carrier. It may be mentioned that the minimum memory value unit can also be determined by a negative memory value unit and the system operator thus allows this user an overdraft, as on a bank account.

The invention will be further described with reference to an example of an embodiment shown in the drawings to which, however, the invention is not restricted.

Figure 1:
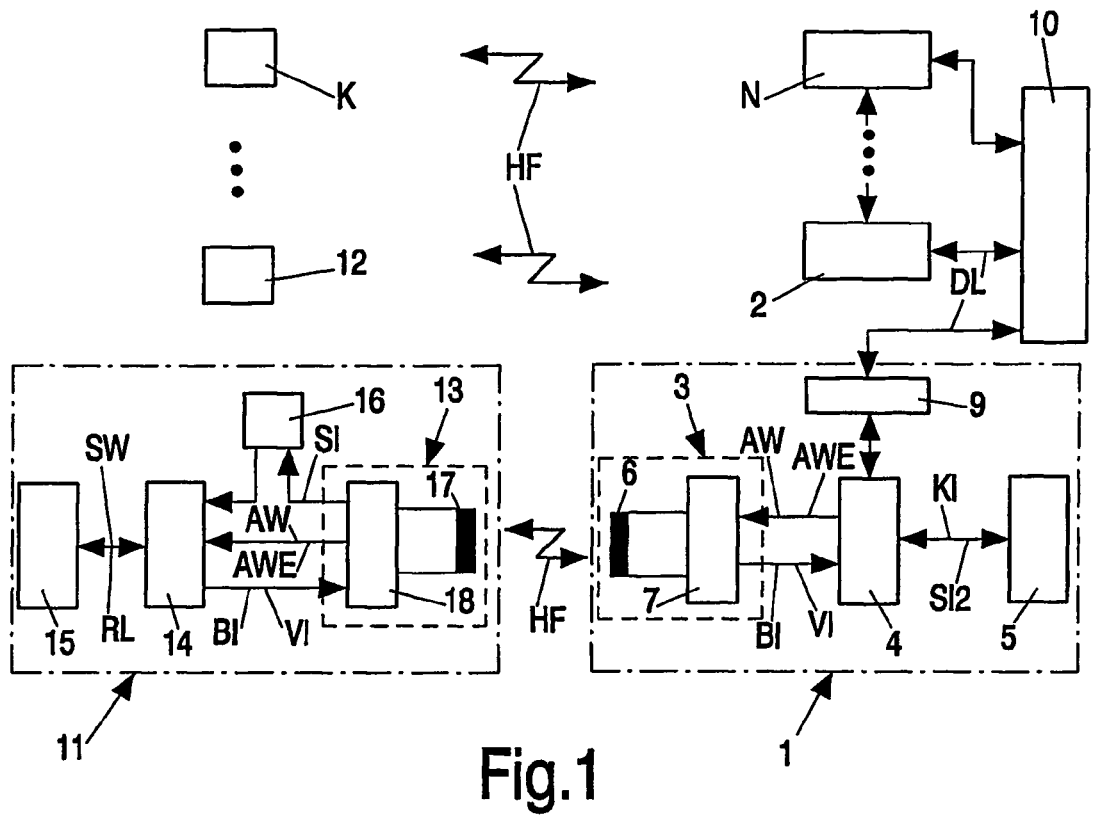
FIG. 1 shows a payment system provided for a subway, consisting of ticket machines that are connected to a server and consisting of electronic tickets for paying the fare for the use of the subway.

FIG. 1 shows a payment system provided for a subway for payment of a user fee or the fare for the use of the subway. Provided for this in each subway station are ticket machines, which form communication facilities and for which each passenger must hold an electronic ticket in a communication field of the ticket machine. Stored in the electronic ticket is a memory value unit SW corresponding to a cash value, from which memory value unit the ticket machine debits a payment value unit BW equivalent to the user fee to be paid.

According to the payment method provided by the payment system, a maximum fare or a debit value unit AW equivalent to this maximum fare is initially debited from the memory value unit SW stored in the electronic ticket, by the ticket machine at the station where the passenger wants to get on the subway. This maximum fare corresponds to the fare that would have to be paid if the passenger were to travel the farthest possible distance to the most distant station of the subway. But if the passenger leaves the subway sooner, then according to the payment method, at the ticket machine in the station at which he gets off, a credit value unit AWE is added to the memory value unit SW stored in the electronic ticket, so that the fare paid previously in excess is credited back. This credit value unit AWE is calculated by subtraction from the previously debited debit value unit AW of the payment value unit BW to be paid for the distance actually traveled with the subway.

A first ticket machine 1 is provided in a first subway station, a second ticket machine 2 in a second subway station, and similarly a ticket machine in all further stations until the Nth station, with an Nth ticket machine provided in the Nth station. The structure of all these ticket machines corresponds to the structure of the first ticket machine 1, which is presented in detail in FIG. 1.

The first ticket machine 1 comprises communication means 3, processing means 4 and storage means 5, and is developed to communicate with electronic tickets brought into the communication field HF. The first ticket machine 1 is developed here to debit the debit value unit AW and to credit the credit value unit AWE, in order finally to debit the payment value unit BW from the memory value unit SW stored in the electronic ticket, as payment of the fare for the journey on the subway. The communication means 3 are formed by an antenna 6 and a communication stage 7, wherein the communication stage 7 comprises a modulator to modulate the high-frequency electromagnetic communication field HF output by the ticket machine 1 for transmitting the credit value unit AWE and debit value unit AW to be transmitted to the electronic ticket. The communication stage 7 further comprises a demodulator to demodulate a confirmation BI transmitted in the communication field HF from the electronic ticket to the first ticket machine 1, which confirmation is transmitted to confirm that the respective debit or credit transaction has been successfully concluded. The contactless communication of such information between a communication facility and a data carrier, such as the electronic ticket, has long been known, so is not dealt with in any more detail.

Figure 2:
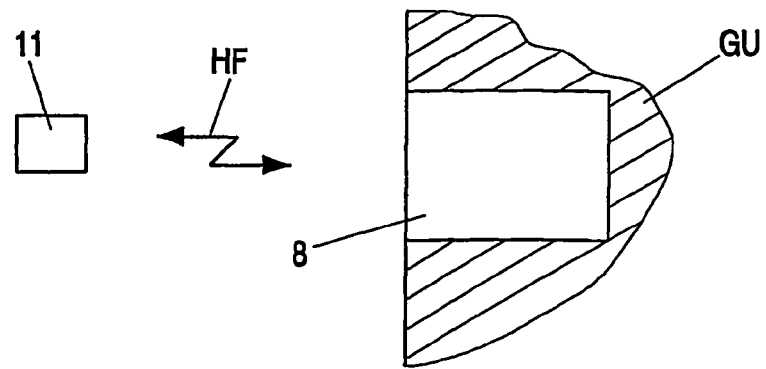
FIG. 2 shows a ticket machine at which, on payment of a sum of money, memory value units equivalent to this sum can be credited to an electronic ticket for paying the fare.

The processing means 4 are formed by a microprocessor, and the storage means 5 are formed by an EEPROM. Among other data that can also be stored with storage means 5 is key information SI, which identifies a credit authorization for the communication facility, wherein the communication facility is authorized to credit the credit value unit AWE up to at most the value of a maximum credit limit ML if a stored first key information SI1 identifies a first credit authorization, and wherein the communication facility is authorized to credit the credit value unit AWE up to at most the value of a repayment limit RL stored in the electronic ticket if a stored second key information SI2 identifies a second credit authorization. The first key information SI1 is stored in storage means of a crediting device 8 shown in FIG. 2 which likewise forms a communication facility, and the second key information SI2 is stored in the storage means of the ticket machines 1, 2, . . . , N, this being dealt with in more detail on the basis of a example of application below.

The first ticket machine 1 further comprises interface means 9, to which a data line DL is connected, over which the first ticket machine 1 is connected to a server 10. The server 10 is provided for storing characteristic information KI identifying the electronic tickets, and debit value units AW, this being dealt with in more detail below.

FIG. 1 further shows a first electronic ticket 11 of a first passenger, a second electronic ticket 12 of a second passenger and further electronic tickets up to a Kth electronic ticket of a Kth passenger on the subway. All these electronic tickets have the same structure as the first electronic ticket 11 and form data carriers for contactless communication with the ticket machines 1 to N.

The first electronic ticket 11 comprises communication means 13, processing means 14, storage means 15 and key information checking means 16. The communication means 13 comprise an antenna 17 and a communication stage 18, which is developed to derive energy, to supply the electronic ticket 11 with a supply voltage, and to demodulate or modulate information to be transmitted in the communication field HF from or to communication facilities respectively. The storage means 15 formed by an EEPROM are developed for storing the memory value unit SW and the repayment limit RL, this being dealt with in more detail below.

The processing means 14 form limit setting means for setting the repayment limit RL to the value of the last debited debit value unit AW, and form limit checking means for checking that the credit value unit AWE to be credited does not exceed the stored repayment limit RL, and only if this is the case is the credit value unit AWE credited to the memory value unit SW stored in the electronic ticket 11.

Figure 3:
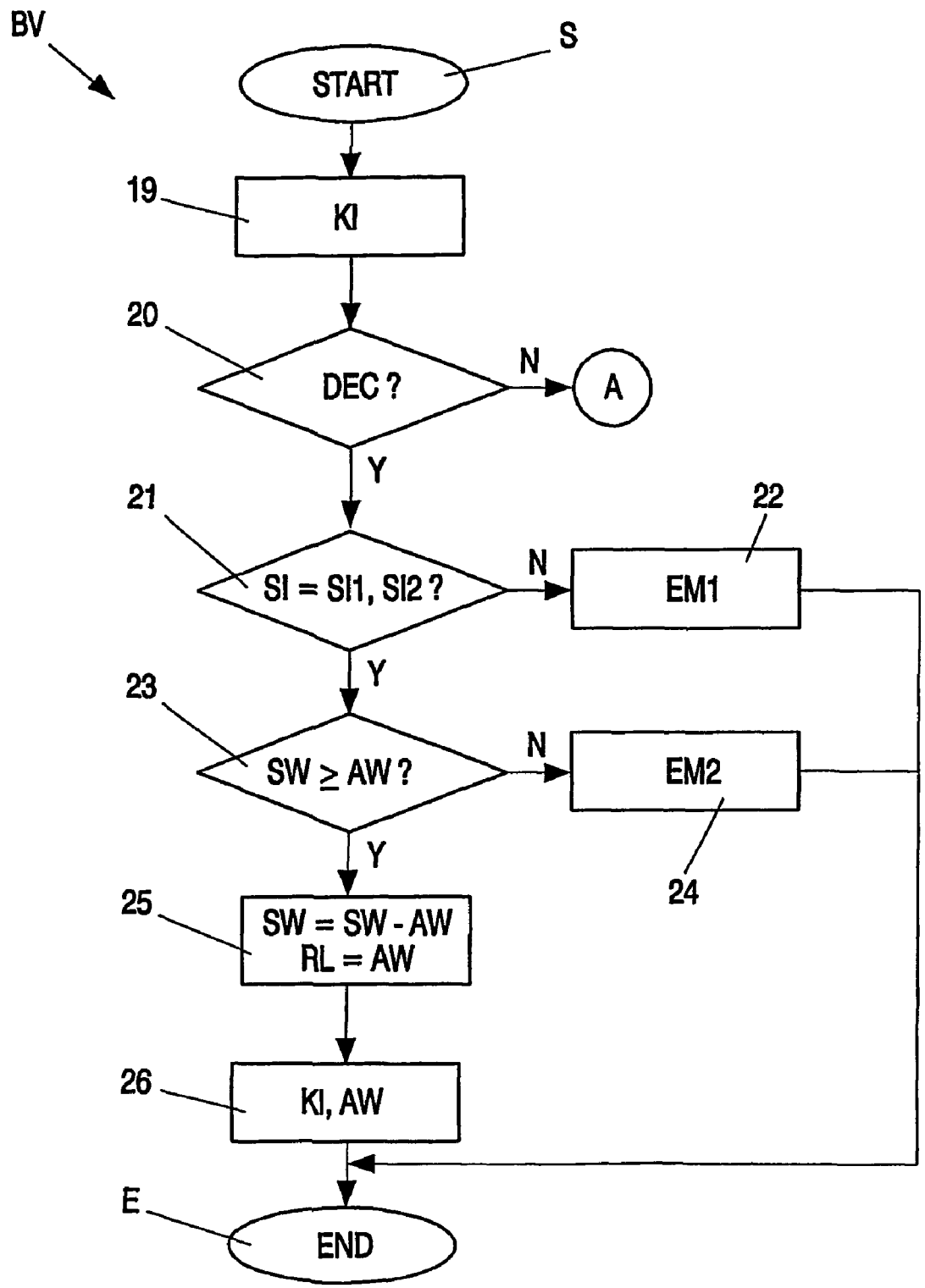
FIG. 3 and FIG. 4 show a payment method for debiting a payment value unit from the electronic ticket in order to pay the fare, and for crediting memory value units with the ticket machine as in FIG. 2.
Figure 4:
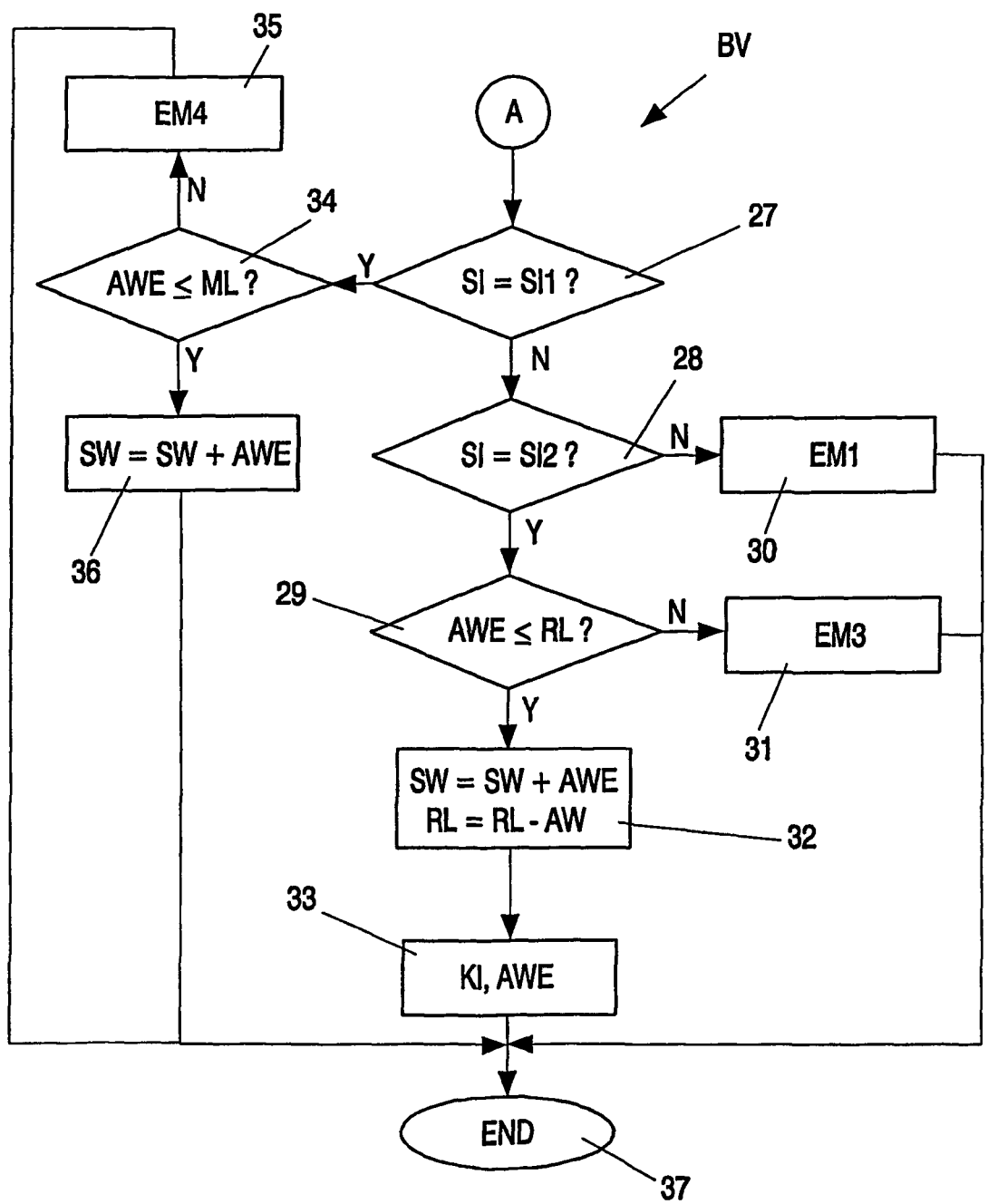

This results in the advantage that only a credit value unit AWE that is smaller than or equal to the previously debited debit value unit AW can ever by credited by ticket machines to the respective electronic ticket; this is dealt with in more detail on the basis of the following example of application and the payment method BV represented in FIGS. 3 and 4.

According to the example of application, it is assumed that Mr. Miller wants to travel on the subway from its first station to its fifth station. To do this, Mr. Miller goes to the first ticket machine 1 in the first station and holds his electronic ticket—the first electronic ticket 11—in the communication field HF of the first ticket machine 1. The execution of the payment method BV is thus begun at a block S.

Electronic tickets brought into the communication field HF of the first ticket machine 1 are identified according to a generally known anti-collision system using characteristic information KI (its serial number) typical for every electronic ticket. In a block 19, the first electronic ticket 11 is identified by its characteristic information KI, in order to carry out the subsequent communication only with this first electronic ticket 11. The characteristic information KI of the first electronic ticket 11 is also stored in the storage means 5 of the first ticket machine 1.

As soon as the first electronic ticket 11 is identified by means of its characteristic information KI, the first ticket machine 1 communicates to the first electronic ticket 11 that the debit value unit AW=80 should be debited from the memory value unit SW stored in the first electronic ticket 11. The debit value unit AW=80 corresponds here to a cash value of 8 euro, which Mr. Miller would have to pay as fare if he were to travel to the 20$^{th}$ (=Nth) station on the subway.

At a block 20, the processing means 14 of the first electronic ticket 11 check whether the first ticket machine 1 wants to make a debit or credit. If credit value units AWE should be added and thus credited to the memory value unit SW stored in the storage means 15, then the payment method BV is continued with a part A of the payment method BV, shown in FIG. 4. However, in the example of application, the first ticket machine 1 wants to debit the electronic ticket 11, and consequently the payment method BV is continued with a block 21.

In block 21 the key information checking means 16 check whether the key information SI transmitted from the first ticket machine 1 to the first electronic ticket 11 corresponds to the first key information SI1 or the second key information SI2. This is because communication facilities with both the first and the second credit authorization are also authorized for debiting of debit value units AW from electronic tickets. If the check of the key information checking means 16 reveals that the key information SI transmitted from the communication facility corresponds to neither the first nor the second key information SI and thus no authorization is present, then the electronic ticket issues a denial information VI to the communication facility, whereupon the payment method BV is continued at a block 22, in which an error message EMI="The communication facility is not authorized for crediting/debiting" is displayed on a display of the communication facility.

In the example of application, the check by the key information checking means 16 reveals that the first ticket machine 1 has the second credit authorization and thus also the authorization for debiting, and consequently the payment method BV is continued with a block 23. In block 23, the processing means 14 of the first electronic ticket 11 check whether the memory value unit SW=100 stored in the storage means 15 is greater than or equal to the debit value unit AW=80 to be debited. If this check reveals that the credit stored in the first electronic ticket 11 is no longer sufficient to pay the maximum fare, then the first electronic ticket 11 issues a corresponding denial information VI to the first ticket machine 1 in a block 24, and the machine's display outputs the error message EM2="Please recharge your electronic ticket at a crediting device".

In the example of application, the stored memory value unit SW=100 is sufficient to enable the debit of the debit value unit AW=80 which should be debited, and consequently the payment method BV is continued with a block 25. In block 25, the debit value unit AW=80 to be debited is subtracted from the stored memory value unit SW=100, and the new memory value unit SW=20 is stored in the storage means 15.

The limit setting means of the electronic ticket 11 are now developed to set the repayment limit RL to the value of the debited debit value unit AW=80, and store this repayment limit RL=80 in the storage means 15. In a subsequent block 26, the first ticket machine 1 transmits the characteristic information KI of the first electronic ticket 11, and the debit value unit AW=80 debited from the first electronic ticket 11, to the server 10, which stores this information. The debit transaction is thus ended in a block E, and Mr. Miller can go on the subway.

In the example of application it is now assumed that Mr. Muller leaves the subway at the fifth station, and holds his first electronic ticket 11 in the communication field HF of the fifth ticket machine, whereupon the execution of the payment method BV begins again at block S. In block 19, the first electronic ticket 11 is identified from its characteristic information KI by the fifth ticket machine, and the debit value unit AW=80 stored in the server 10 for this characteristic information KI is loaded into the processing means of the fifth ticket machine.

The fifth ticket machine now calculates the payment value unit BW=20 as the user fee to be paid, as Mr. Miller has only traveled a quarter of the maximum distance with the subway, for which he would have had to pay a user fee equivalent to the debit value unit AW=80 already debited by the first ticket machine 1. The credit value unit AWE to be credited back to the first electronic ticket 11 is thus calculated as AWE=AW−BW=60.

The fifth ticket machine communicates to the first electronic ticket 1 the credit value unit AWE=60 to be credited and the second key information S12, and the electronic ticket's processing means 14 detect in block 20 that the fifth ticket machine wants to make a credit, so the execution of the payment method BV is continued with a block 27.

In block 27, the key information checking means 16 check whether the fifth ticket machine has transmitted the first key information SI1 to the first electronic ticket 11. In a subsequent block 28 it is established that the fifth ticket machine has transmitted the second key information SI2, whereupon processing is continued in a block 29. If a communication facility transmits no valid key information SI to the first electronic ticket 1, then the processing is continued in a block 30, and the error message EM1 is shown on the display of the communication facility.

This results in the advantage that if a person without the authorization wishes to store cash-equivalent credit value units AWE in the electronic ticket with fraudulent intent with a communication facility that is suitable for communication with electronic tickets but has no credit authorizations at all, this will not succeed. In order to get at key information SI and thus at a credit authorization, thieves could steal one of the ticket machines, which are usually installed in not very well protected environments. Advantageously, however, such a thief would thereby only obtain the second key information SI2, with which crediting is only possible up to a maximum of the credit value unit AWE limited by the repayment limit RL.

In block 29, the limit checking means of the first electronic ticket 11 check whether the repayment limit RL is greater than or equal to the credit value unit AWE. If it is not, then this can only be the result of fraudulent or incorrect handling, as none of the ticket machines in the payment system will credit more than was previously debited. In this case the processing of the payment method BV is continued at a block 31, where an error message EM3="Please contact the ticket office" is shown on the display of the communication facility. Further safety measures such as blocking the electronic ticket could additionally be undertaken.

This results in the advantage that even if a ticket machine that was relatively easy to steal was stolen by a thief, this would not give the thief any opportunity to increase the value of the memory value unit SW stored in the electronic ticket, and thus steal money from the operator of the payment system.

In block 29 the limit checking means detect that the credit value unit AWE=60 is smaller than the current repayment limit RL=80, and continue the execution of the payment method BV at a block 32. In block 32, the credit value unit AWE=60 is added to the memory value unit SW=20 stored in the first electronic ticket 11, and the new memory value unit SW=80 is stored in the storage means 15. The effect of this is that Mr. Muller has only paid the payment value unit BZ=20 equivalent to the cash value of 2 euro for the journey of five stations on the subway.

In block 32 the repayment limit RL=80 is further reduced by the credited credit value unit AWE=60 to the repayment limit RL=20. The new repayment limit RL=20 is stored in the storage means 15 of the first electronic ticket 11. This ensures that in further credit transactions no more than the credit value unit AWE=20 can be credited overall.

The repayment limit RL could be reset to zero after each credit transaction, which depending on the application may have the advantage that after each debit transaction only one credit transaction is possible. In other applications, it may conversely be advantageous to enable several credit transactions after each debit transaction, while the repayment limit will still ensure that with the second credit authorization it will never be possible to credit more than has previously been debited.

In a block 33 the credit value unit AWE=60 and the characteristic information KI of the first electronic ticket 11 are transmitted to the server 10, which stores this information.

In the example of application, Mr. Miller wants to increase his credit on the first electronic ticket 1 after the trip on the subway, and therefore goes to the crediting device 8 shown in FIG. 2. Like a cash dispenser, the crediting device is installed in a protected environment GU. The protected environment may be provided by walling in the crediting device, or by installing the crediting device in a bank.

In principle the crediting device has the same structure as the first ticket machine 1, wherein the crediting device is connected via interface means with a bank. Mr. Miller brings the first electronic ticket 11 into the communication field HF of the crediting device 8, whereupon the first electronic ticket 11 is identified from its characteristic information KI in the block 19 of the payment method BV. By means of a keyboard of the crediting device 8, Mr. Miller then specifies the sum of 100 euro, which he wants to credit as a credit value unit AWE=1,000 to the first electronic ticket 11. Mr. Miller also enters his account number and the secret number that empowers him to debit the sum of money from his account. The crediting device then communicates the credit value unit AWE and the first key information SI1 stored in the crediting device, to the first electronic ticket 11.

In block 20 the processing means 14 detect that a credit should be made, and consequently processing is continued with block 27. In block 27 it is detected that the crediting device 8 has the first credit authorization, and consequently processing is continued with a block 34.

In block 34, it is checked whether the credit value unit AWE=1,000 to be credited is smaller than or equal to a maximum limit for credits ML=3,000. The amount of money that can be credited is thereby limited to a reasonable value, hence further increasing the safety of the payment system. If it is established by the processing means 14 in block 34 that the credit value unit AWE exceeds the maximum limit for credits, then in a block 35 an error message EM4="The amount is too high" is shown on a display of the crediting device 8.

In block 34 the processing means 14 establish that the credit value unit AWE to be credited is smaller than the maximum limit for credits, and consequently in a block 36 the credit value unit AWE=1,000 is added to the memory value unit SW=80 stored in the first electronic ticket, and the new memory value unit 1,080 is stored in the storage means 15. The payment method BV then ends at a block 37.

This results in the advantage that only communication facilities installed in a protected environment hold the first key information SI1, which enables effective crediting of sums of money to electronic tickets. This ensures a very high overall security of the payment system and payment method.

It may be mentioned that when credit value units are credited, the reset limit can be set to zero at the crediting devices, or be left unchanged. Both options have advantages depending on the application.

With the payment method according to the invention, an entirely new method of securely handling transactions is gained. This method can be applied to a number of different transaction types. For example, it could be used for any type of deposit system. Three books could be borrowed from a library, for instance, with a deposit of 10 euro and a borrowing fee of one euro being required for each book, so that 33 euro is debited from a user's electronic data carrier. The repayment limit RL is set accordingly. The user returns one book after one week, and the other two books after a further two weeks. The respective deposit for the books is credited each time to the user's electronic data carrier, and the repayment limit reduced accordingly. In this deposit system too, the advantages described with reference to the payment system are gained.

It may be mentioned that data carriers according to the invention can be formed by contactless active or passive data carriers as well as by data carriers with contacts. Communication facilities according to the invention may likewise be developed for contact or contactless communication with data carriers. Systems based on magnetic strips on the data carriers would therefore also be possible.

It may be mentioned that the repayment limit RL could also be transmitted to the server 10 for storage.

It may be mentioned that the check in block 23, of whether the debit value unit AW to be debited is smaller than the stored memory value unit SW, could also be amended as follows. It could be checked that the memory value unit will not fall below a minimum value MSW as a result of debiting the debit value unit AW that is to be debited. This minimum memory value unit could be formed by a negative memory value unit for customers who have been known to the system operator for a long time. Thus within a limit set by the minimum memory value unit MSW, the user could borrow memory value units from the system operator, as has long been customary with accounts. This results in the advantage that a user who has rather too few memory value units SW stored on his electronic ticket, for instance, can still go on the subway and can delay going to the automatic recharging device until later.

It may be mentioned that with the payment method according to the invention, any types of performances can be paid for. As well as services, the purchase price of a product could also be paid, wherein a maximum amount is paid in advance in each case, and reduced later by repayment to the amount that actually has to be paid.

It may be mentioned that the repayment limit only has to be set in essence in the debit transaction, and thus need not be set precisely to the debit value unit. The repayment limit could also already be set lower by a certain value unit, which corresponds to the subway fare for the distance to the next station. Similarly, the repayment limit could be set rather higher than the debit value unit, if that is advantageous in the particular application.

It may be mentioned that the maximum limit for credits can restrict the credit value unit that can be credited by the communication facility. In this case, no more than credit value units limited by the maximum limit for credits could be credited in each credit transaction at a communication facility with the first credit authorization. It can likewise be checked in the data carrier whether the sum of the memory value units already stored in the data carrier, and the credit value unit to be credited, exceeds the maximum limit for credits. In this case, no memory value unit exceeding the maximum limit for credits could be stored in the data carrier. Both variants have advantages in certain applications.

The invention claimed is:

1. A payment method, executed by a communication facility in a first location and a data carrier in a second location, different from the first location, for debiting a payment value unit from the data carrier, in order to pay for a subsequently performed service, the method comprising:

debiting, from a memory value unit stored in the data carrier, a value of a debit value unit sufficient for payment for the subsequently performed service;

setting a repayment limit, stored in the data carrier, to the value of the debited debit value unit;

calculating a credit value unit, to be credited back to the memory value unit, by subtracting a payment value unit to be paid for an actually performed service from the debited debit value unit;

making a determination, by the data carrier, that the credit value unit to be credited does not exceed the stored repayment limit; and crediting the credit value unit to the memory value unit stored in the at least one data carrier based upon a first key stored in the first location, but crediting only when the credit value unit to be credited does not exceed the stored repayment limit based upon a second key stored in the second location.

2. The payment method of claim 1, further comprising:
after the crediting of the credit value unit to the data carrier, reducing the repayment limit stored in the data carrier by at least the credited credit value unit.

3. The payment method of claim 2, further comprising:
after the crediting, additionally reducing the repayment limit to zero.

4. The payment method of claim 1, further comprising
before the crediting of the credit value unit to the at least one data carrier, checking key information output by the communication facility;

identifying the communication facility's credit authorization by the data carrier;

authorizing the communication facility to credit the credit value unit up to at most the value of a maximum credit limit if the communication facility has a first credit authorization; and authorizing the communication facility to credit the credit value unit up to at most the value of the repayment limit stored in the data carrier if the communication facility has a second credit authorization.

5. The payment method of claim 1, wherein the debiting only occurs if the memory value unit stored in the data carrier after the debiting does not fall below a minimum memory value unit.

6. The payment method of claim 1, wherein the first location is a highly secure environment and the second location is a relatively insecure environment.

7. A data carrier for payment of a performed service by debiting of a payment value unit from a memory value unit, the data carrier comprising:

a storage device that stores the memory value unit and a repayment limit;

a communication device that communicates with a communication facility for crediting a credit value unit to be added to the stored memory value unit and for debiting a debit value unit to be subtracted from the stored memory value unit; and a processor, wherein the processor is coupled to the storage device and the communication device, that sets the repayment limit to the value of the last debited debit value unit (AW); and determines whether the credit value unit to be credited exceeds the stored repayment limit, wherein the credit value unit is added to the memory value unit stored in the at least one data carrier based upon a first key stored in a remote location, but is credited only when the credit value unit to be credited does not exceed the stored repayment limit based upon a second key stored in a location near the data carrier.

8. The data carrier of claim 7, wherein the processor reduces the repayment limit stored in the data carrier at least by the credited credit value unit, after the crediting of the credit value unit to the data carrier.

9. The data carrier of claim 7, wherein the processor additionally sets the repayment limit stored in the data carrier to zero, after the crediting of the credit value unit to the data carrier.

10. The data carrier of claim 7, further comprising:
an authorization device that checks key information identifying a credit authorization received from the communication facility via the communication device, wherein the communication facility authorizes crediting the credit value unit up to at most the value of a maximum credit limit if the communication facility has a first credit authorization, and wherein the communication facility authorizes crediting the credit value unit up to at most the value of the repayment limit stored in the data carrier if the communication facility has a second credit authorization.

11. The data carrier of claim 7, further comprising:
an authorization device that checks, before the debiting of the debit value unit, whether the memory value unit stored in the data carrier would fall below a minimum memory value unit as a result of the debiting.

12. The data carrier of claim 7, wherein the first location is a highly secure environment and the second location is a relatively insecure environment.

13. The data carrier of claim 7, wherein the storage device is an Electrically Erasable Programmable Read-Only Memory (EEPROM).

14. The data carrier of claim 7, wherein the communication device comprises an antenna and a communication stage.

15. A communication facility in a first location, which enables the payment for a performed service by debiting of a payment value unit from a memory value unit stored in a data carrier in a second location, different from the first location, the communication facility comprising:
a communication device that communicates with the data carrier for debiting a debit value unit sufficient for payment for a maximum service to be performed from the memory value unit stored in the data carrier and for crediting a credit value unit, wherein the payment value unit to be paid for the actually performed service is subtracted from the debited debit value unit; and
a storage device that stores key information which identifies a credit authorization of the communication facility device,
wherein a processor authorizes crediting the credit value unit up to at most the value of a maximum credit limit if the stored key information identifies a first credit authorization based upon a first key stored in the first location and the processor is coupled to the storage device and the communication device, and
wherein the communication facility authorizes crediting the credit value unit up to at most the value of a repayment limit stored in the data carrier if the stored key information identifies a second credit authorization, wherein the repayment limit does not exceed the last debit value unit debited from the data carrier based upon a second key stored in the second location.

16. The communication facility of claim 15, wherein the storage device also stores characteristic information identifying the data carrier together with the repayment limit set for the data carrier.

17. The communication facility of claim 15, further comprising:
an interface device that communicates the characteristic information of the data carrier and the current repayment limit for the data carrier.

18. The communication facility of claim 15, wherein the first location is a highly secure environment and the second location is a relatively insecure environment.

19. The communication facility of claim 15, wherein the communication device comprises an antenna and a communication stage.

20. The communication facility of claim 15, wherein the storage device is an Electrically Erasable Programmable Read-Only Memory (EEPROM).

* * * * *